United States Patent
Jang et al.

(10) Patent No.: US 11,997,032 B2
(45) Date of Patent: May 28, 2024

(54) TRIGGER FRAME TRANSMISSION IN WIRELESS COMMUNICATION SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Eunsung Park, Seoul (KR); Namyeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/136,695

(22) Filed: Apr. 19, 2023

(65) Prior Publication Data

US 2023/0261818 A1 Aug. 17, 2023

Related U.S. Application Data

(63) Continuation of application No. 17/925,811, filed as application No. PCT/KR2021/006228 on May 18, 2021.

(30) Foreign Application Priority Data

May 18, 2020 (KR) .......................... 10-2020-0059192
May 21, 2020 (KR) .......................... 10-2020-0061070

(51) Int. Cl.
*H04L 5/00* (2006.01)
*H04L 1/00* (2006.01)
*H04W 84/12* (2009.01)

(52) U.S. Cl.
CPC .......... *H04L 5/0044* (2013.01); *H04L 1/0013* (2013.01); *H04W 84/12* (2013.01)

(58) Field of Classification Search
CPC ..... H04L 5/0044; H04L 1/0013; H04W 84/12
See application file for complete search history.

(56) References Cited

U.S. PATENT DOCUMENTS

2016/0360528 A1* 12/2016 Kim ...................... H04W 72/23
2018/0132228 A1* 5/2018 Lan ...................... H04W 72/21
(Continued)

FOREIGN PATENT DOCUMENTS

| JP | 2018512765 A | 5/2018 |
| JP | 2018530222 A | 10/2018 |
| WO | 2018155160 A1 | 8/2018 |

OTHER PUBLICATIONS

Huawei, Multi-Ru indication Trigger Frame, IEEE 802.11-20/0416ro, Mar. 15, 2020, (Year: 2020).*

(Continued)

*Primary Examiner* — Mohammad S Anwar
(74) *Attorney, Agent, or Firm* — BRYAN CAVE LEIGHTON PAISNER LLP

(57) ABSTRACT

In a Wireless Local Area Network system, an STA may receive a trigger frame from an AP. The trigger frame may include a common information field and user information fields. Each of the user information fields may include a first field related to an association identifier (AID) and a second field including information for the STA related to the AID. The second field may include special information for every STA receiving the trigger frame on the basis that the first field has a specific value. The common information field may include a present field related to whether a user information field in which the first field has the specific value is present among the user information fields.

21 Claims, 23 Drawing Sheets

(56) References Cited

U.S. PATENT DOCUMENTS

2019/0007973 A1   1/2019  Lou et al.
2019/0097850 A1*  3/2019  Kenney ................. H04L 5/0044
2019/0141570 A1*  5/2019  Verma ................. H04W 28/065
2019/0261369 A1*  8/2019  Verma ................. H04B 7/0619

OTHER PUBLICATIONS

PureLIFI, Gigalifi, "TGbb MAC Channel Access features proposal", doc.: IEEE 802.11-19/0846r1, Apr. 24, 2019.
MediaTek Inc., "EHT RTS and CTS Procedure", doc.: IEEE 802.11-19/2125r2, Mar. 18, 2020.

* cited by examiner (a)

(b)

TRIGGER FRAME TRANSMISSION IN WIRELESS COMMUNICATION SYSTEM

CROSS REFERENCE TO RELATED APPLICATIONS

This application is a Continuation of U.S. patent application Ser. No. 17/925,811, filed on Nov. 16, 2022, which is the National Stage filing under 35 U.S.C. 371 of International Application No. PCT/KR2021/006228, filed on May 18, 2021, which claims the benefit of and priority to Korean Patent Application No. 10-2020-0059192, filed on May 18, 2020 and Korean Patent Application No. 10-2020-0061070, filed on May 21, 2020, which are all hereby incorporated by reference herein in their entirety.

TECHNICAL FIELD

The present specification relates to a method of transmitting a trigger frame in a wireless local area network (WLAN) system, and more particularly, to an operation based on the trigger frame and information included in the trigger frame.

BACKGROUND

Wireless network technologies may include various types of wireless local area networks (WLANs). The WLAN employs widely used networking protocols and can be used to interconnect nearby devices together. The various technical features described herein may be applied to any communication standard, such as Wi-Fi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a wireless local area network (WLAN) system according to various embodiments, a station (STA) may receive a trigger frame from an access point (AP). The trigger frame may include a common information field and a user information field. The user information field may include a first field related to an association identifier (AID) and a second field including information for a STA related to the AID. The second field may include special information for all STAs which receive the trigger frame, based on that the first field has a specific value. The common information field may include a present field related to whether the user information field having the specific value is present in the first field of the user information field.

According to an example of the present specification, it is possible to increase an amount of information included in a trigger frame while directly using a format of the existing trigger frame. Since information related to the 11be feature is included in a user field corresponding to a specific AID, there is no problem in backward compatibility and it is advantageous to secure forward compatibility. That is, since an AID related to special information needs to be newly set in a future standard, it can be continuously used for a next-generation standard.

DETAILED DESCRIPTION

Figure 1:
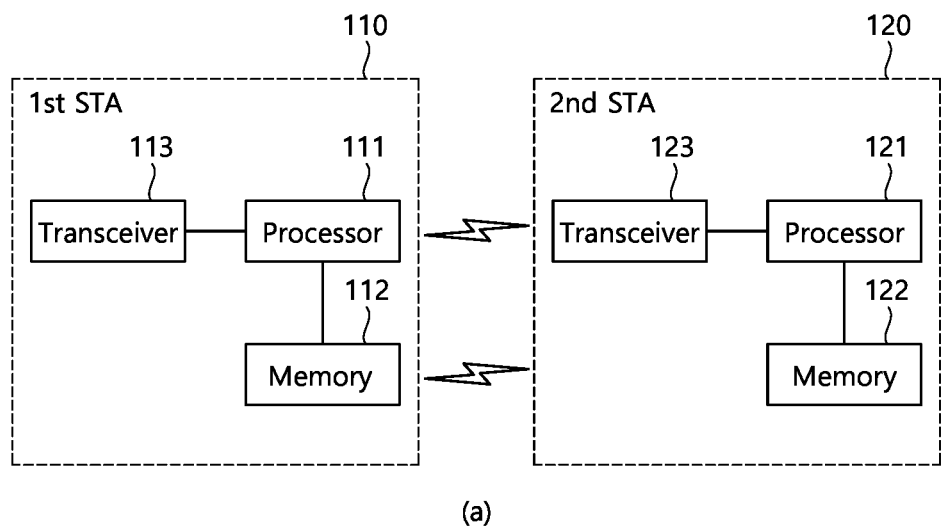
FIG. 1 shows an example of a transmitting apparatus and/or receiving apparatus of the present specification.
Figure 1:
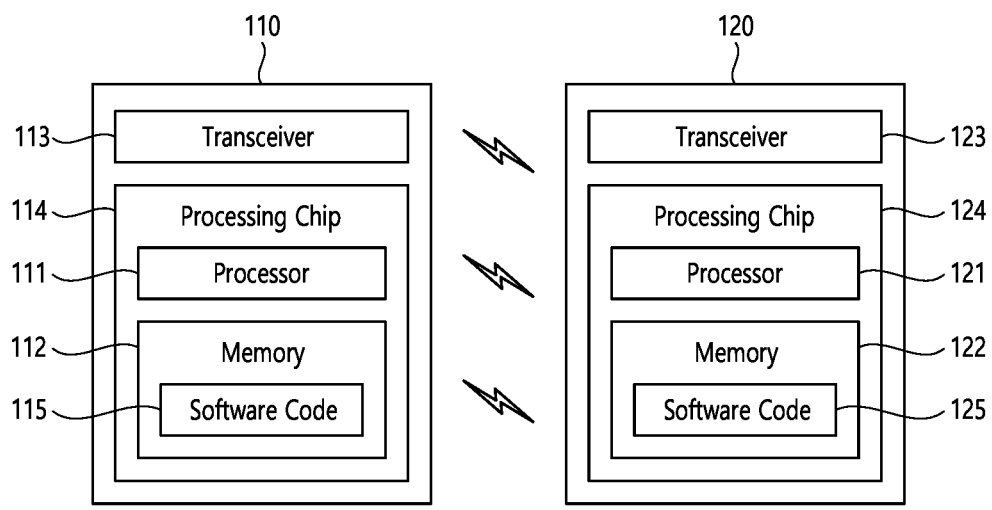

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
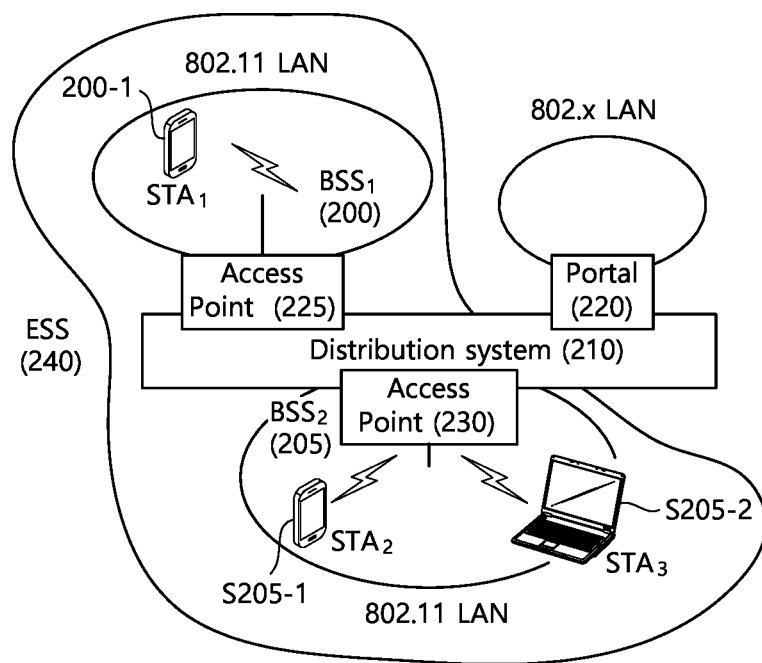
FIG. 2 is a conceptual view illustrating the structure of a wireless local area network (WLAN).
Figure 2:
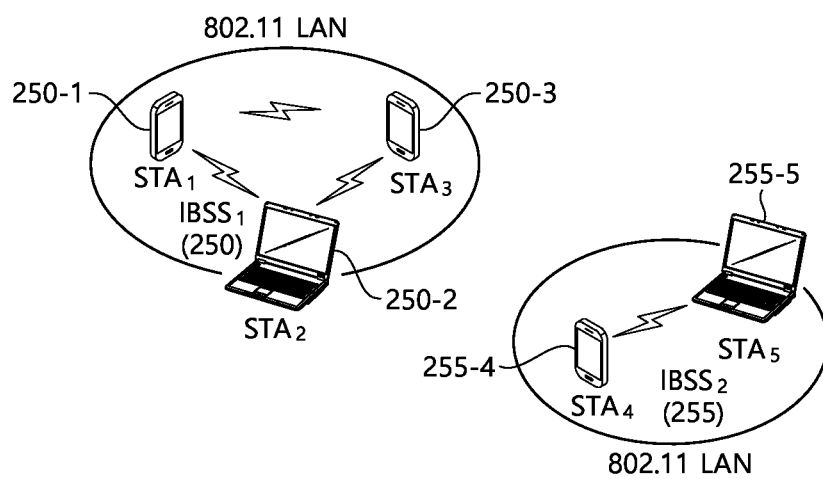

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e.EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e.EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
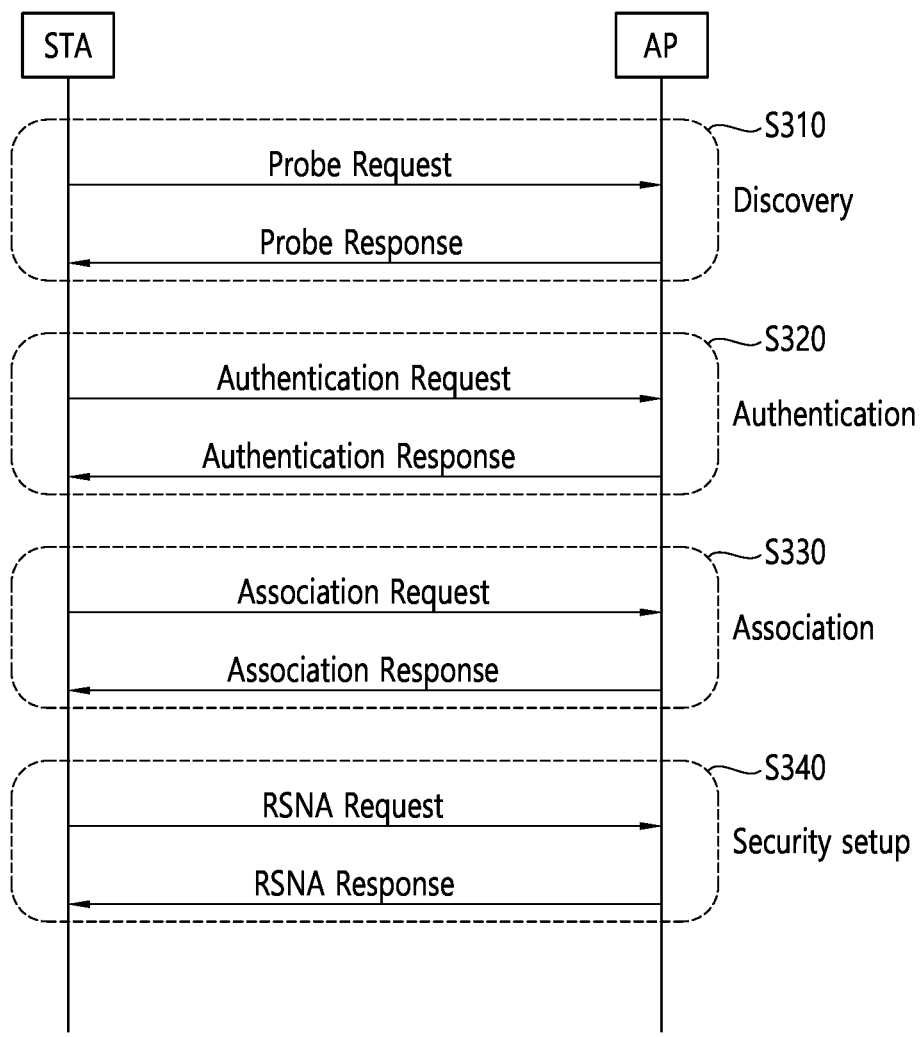
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinct from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
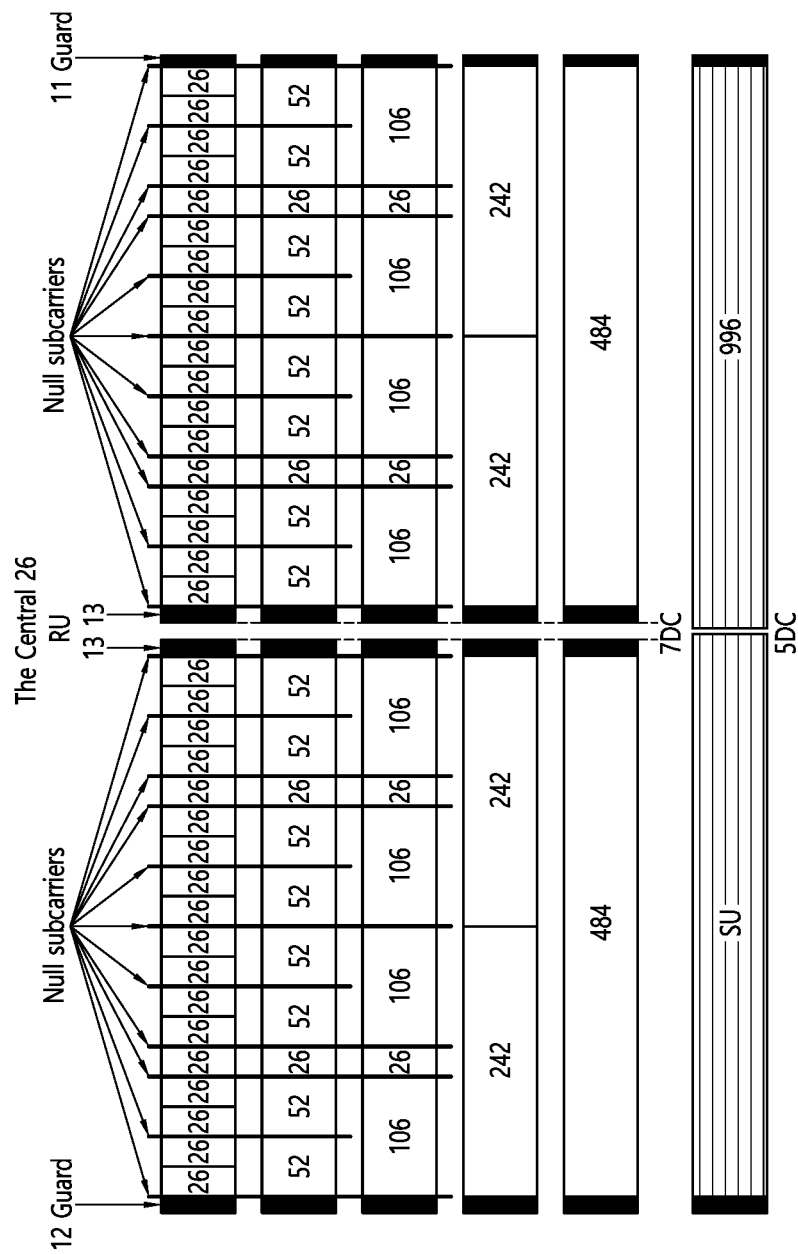
FIG. 4 illustrates a layout of resource units (RUs) used in a band of 80 MHz.

FIG. 4 illustrates a layout of resource units (RUs) used in a band of 80 MHz.

RUs having various sizes such as a 26-RU, a 52-RU, a 106-RU, a 242-RU, a 484-RU, a 996-RU may be used. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

Figure 7:
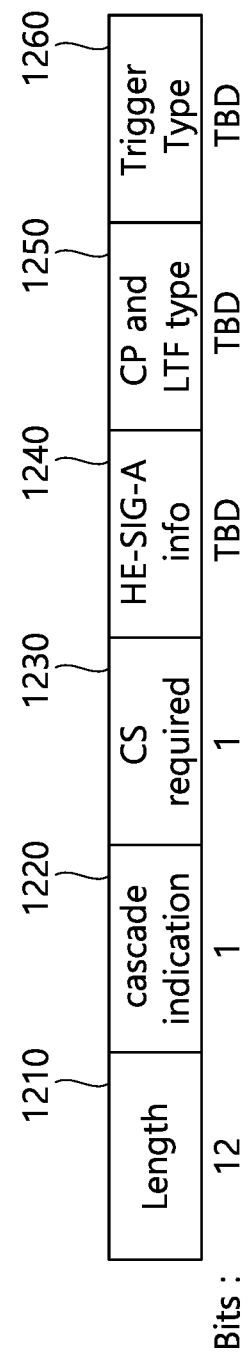
FIG. 7 illustrates an example of a common information field of a trigger frame.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 5:
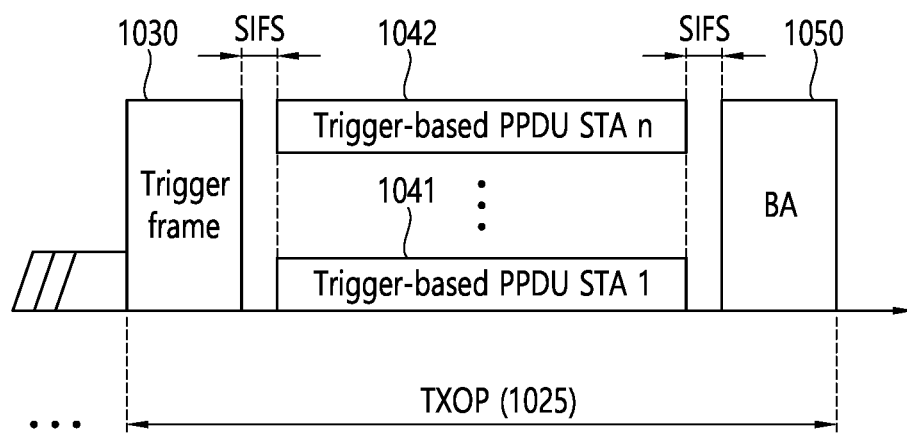
FIG. 5 illustrates an operation based on UL-MU.

FIG. 5 illustrates an operation based on UL-MU. As illustrated, a transmitting STA (e.g., AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
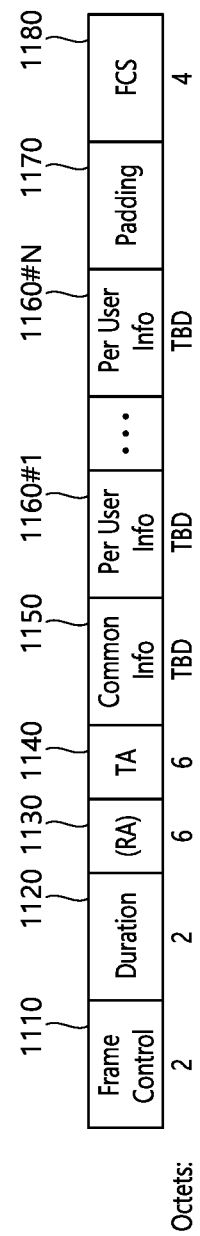
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS required field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
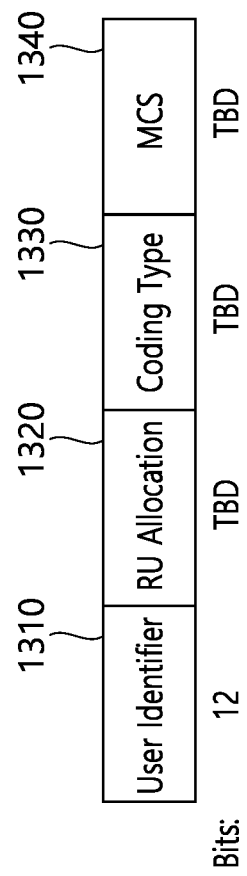
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 4.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a PPDU transmitted/received in a STA of the present specification will be described.

Figure 9:
FIG. 9 illustrates an example of a PPDU used in the present specification.

FIG. 9 illustrates an example of a PPDU used in the present specification.

The PPDU of FIG. 9 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 9 may indicate the entirety or part of a PPDU type used in the EHT system. For example, the example of FIG. 9 may be used for both of a single-user (SU) mode and a multi-user (MU) mode. In other words, the PPDU of FIG. 9 may be a PPDU for one receiving STA or a plurality of receiving STAs. When the PPDU of FIG. 9 is used for a trigger-based (TB) mode, the EHT-SIG of FIG. 9 may be omitted. In other words, a STA which has received a trigger frame for uplink-MU (UL-MU) may transmit the PPDU in which the EHT-SIG is omitted in the example of FIG. 9.

In FIG. 9, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 9 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 9, the L-LTF and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 9. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 6, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 9. The PPDU of FIG. 9 may be used to transmit/receive frames of various types. For example, the PPDU of FIG. 9 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 9 may be used for a management frame. An example of the management frame may include a beacon frame, a (re-)association request frame, a (re-)association response frame, a probe request frame, and a probe response frame. For example, the PPDU of FIG. 9 may be used for a data frame. For example, the PPDU of FIG. 9 may be used to simultaneously transmit at least two or more of the control frame, the management frame, and the data frame.

Figure 10:
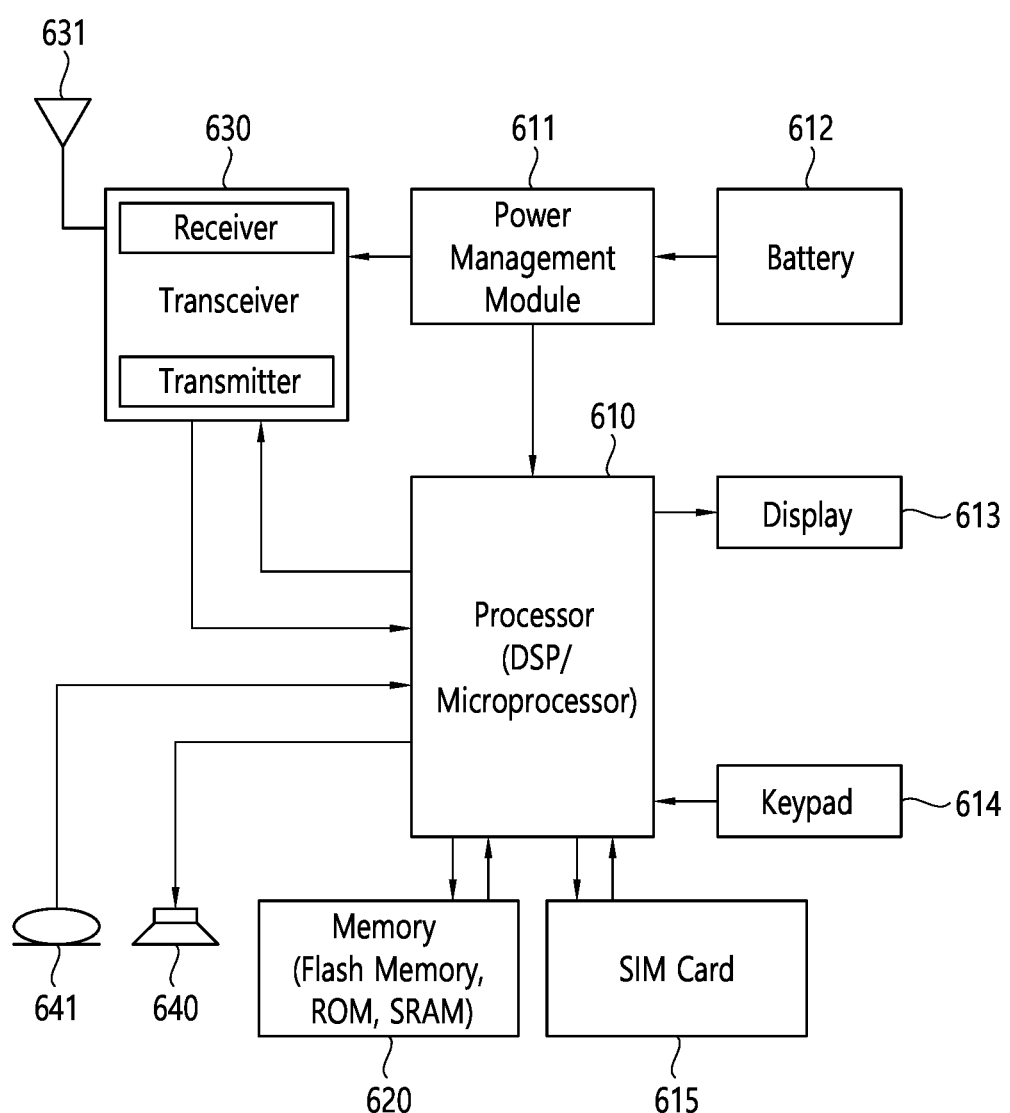
FIG. 10 illustrates an example of a modified transmission device and/or receiving device of the present specification.

FIG. 10 illustrates an example of a modified transmission device and/or receiving device of the present specification.

Each device/STA of the sub-figure (a)/(b) of FIG. 1 may be modified as shown in FIG. 10. A transceiver 630 of FIG. 10 may be identical to the transceivers 113 and 123 of FIG. 1. The transceiver 630 of FIG. 10 may include a receiver and a transmitter.

A processor 610 of FIG. 10 may be identical to the processors 111 and 121 of FIG. 1. Alternatively, the processor 610 of FIG. 10 may be identical to the processing chips 114 and 124 of FIG. 1.

A memory 620 of FIG. 10 may be identical to the memories 112 and 122 of FIG. 1. Alternatively, the memory 620 of FIG. 10 may be a separate external memory different from the memories 112 and 122 of FIG. 1.

Referring to FIG. 10, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 10, a speaker 640 may output a result related to a sound processed by the processor 610. A microphone 641 may receive an input related to a sound to be used by the processor 610.

Puncturing information may be indicated in a trigger based (TB) physical protocol data unit (PPDU) of 11be. That is, the TB PPDU may include the puncturing information. However, when the trigger frame is transmitted using a non-HT duplicate PPDU or the like, if it is transmitted in a puncturing form, a STA which has received the trigger frame cannot recognize the puncturing information by using only content included in the existing trigger frame. Hereinafter, information which may be included in the trigger frame and a trigger frame for including new information while maintaining the existing configuration are described. For example, the new information may be information included in the trigger frame to support an EHT. For example, the new information may include puncturing information, information related to whether 320 MHz is supported, or the like.

Figure 11:
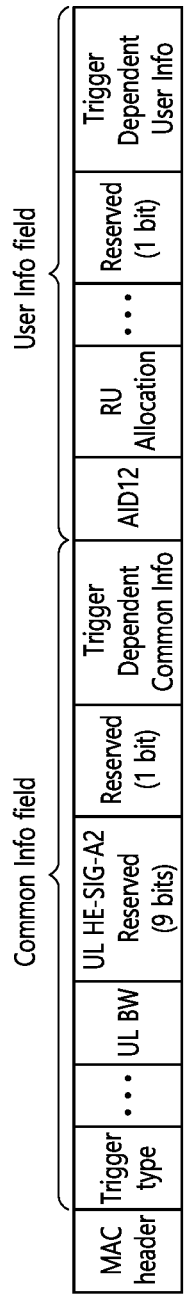
FIG. 11 illustrates an example of a trigger frame.

FIG. 11 illustrates an example of a trigger frame.

Referring to FIG. 11, the trigger frame includes reserved bits. The reserved bits may be used in order for the trigger frame to include new information.

1. Maintain Existing Trigger Frame, Indicate Maximum UL BW

In order to indicate additional information while maintaining the existing trigger frame format, the existing bits shall be used while maintaining the total number of bits included in the trigger frame. It is assumed in the present embodiment that a maximum uplink (UL) bandwidth (BW) is 160 MHz, as in the conventional case (i.e., 11ax).

1) Indicate Puncturing Information (PI) Using HE-SIG-A2 Reserved Field

By default, an HE-SIG-A2 reserved field value which is present in a common field of a trigger frame may be included in a reserved field of a trigger based (TB) PPDU SIG-A2. In particular, in 11be, the existing 11ax HE-SIG-A may be replaced with a U-SIG. The HE-SIG-A2 reserved field may be used to indicate puncturing information. Issues to be considered when indicating the puncturing information are as follows.

The number of PI bits: The number of bits may be considered statically or dynamically according to dependency of a UL bandwidth (BW) value of the common field. That is, the number of bits related to the PI may be set to a specific value, or may vary depending on the UL BW.

Indication Method

A. If a puncturing pattern is not defined, a bitmap indicating independently whether each of 20 MHz segments is punctured (e.g., puncturing if it is 1) may be used.

B. If the puncturing pattern is defined, a value may be specified for each pattern. That is, an index corresponding to each puncturing pattern may be used. The puncturing pattern may not cover all possible cases, and only specific patterns may be used.

For example, if the number of patterns is 10 (i.e., if only 10 puncturing patterns are used), the pattern may be indicated using 4 bits according to each value (e.g., 0000 to 1001).

1-1) Static Method: The Number of Max PI Bits is Set Irrespective of a UL BW Value In the present embodiment, a method in which the number of PI bits is fixed is described separately according to the indication methods A and B described above.

1-1A) In case of the indication method A, that is, in case of using a bitmap indicating independently whether each of 20 MHz segments is punctured, if a (local) BW indicated in PHY (e.g., in U-SIG) is up to 80 MHz, the Max PI bit is 4 bit, and if the BW indicated in the PHY is up to 160 MHz, the Max PI bit is 8 bit.

It may be indicated in an orderly manner from bit0 according to the UL BW value, and a part not corresponding thereto may be a reserved bit. For example, if a maximum UL BW is 160 MHz, the number of Max PI bits may be 8 bit and the UL BW may be 80 MHz. If first 4 bits are 1110, it means that last 20 MHz segments of 80 MHz are punctured, and last 4 bits may be reserved.

Figure 12:
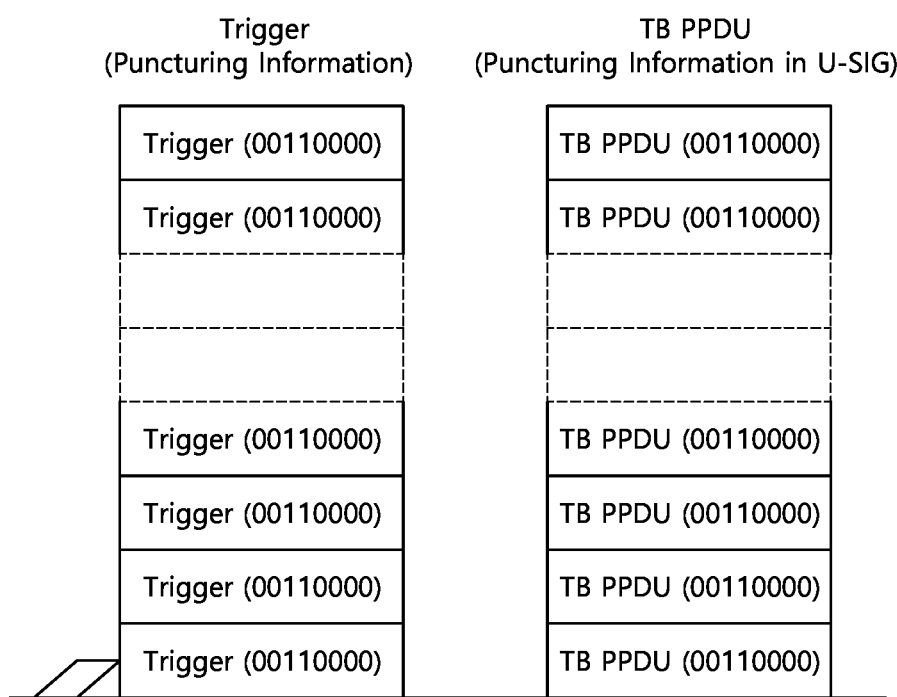
FIG. 12 illustrates an embodiment of the method 1-1A.

FIG. 12 illustrates an embodiment of the method 1-1A.

Referring to FIG. 12, a maximum (local) BW may be 160 MHz, and a UL BW may also be 160 MHz. Since the maximum UL BW is 160 MHz, the number of bits is 8. Since 3rd and 4th 20 MHz segments are punctured, PI may include a bitmap of 00110000. A TB PPDU may include puncturing information in a U-SIG, and the puncturing information included in the U-SIG of the TB PPDU may also include the bitmap of 00110000. The TB PPDU may also be transmitted through a channel in which 3rd and 4th 20 MHz segments are punctured.

Figure 13:
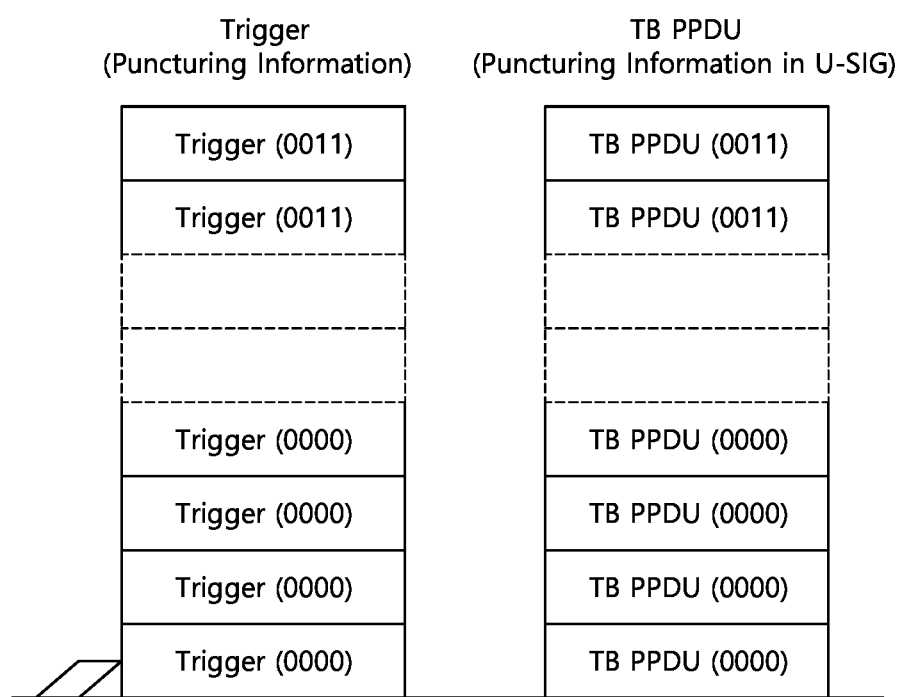
FIG. 13 illustrates an embodiment of the method 1-1A.

FIG. 13 illustrates an embodiment of the method 1-1A.

Referring to FIG. 13, a maximum (local) BW may be 80 MHz, and a UL BW may also be 80 MHz. Since the maximum (local) UL BW is 80 MHz, the number of bits is 4. Since $3^{rd}$ and $4^{th}$ 20 MHz segments are punctured, PI may include bitmaps of 0011 and 0000, respectively. That is, PI of a trigger frame transmitted at an 80 MHz band including a punctured region may include a bitmap of 0011, and PI of a trigger frame transmitted at a non-punctured 80 MHz band may include a bitmap of 0000. A TB PPDU may include puncturing information in a U-SIG, and the puncturing information included in the U-SIG of the TB PPDU may also include the bitmaps of 0011 and 0000, respectively. The TB PPDU may also be transmitted through a channel in which 3rd and 4th 20 MHz segments are punctured.

1-1B) In case of the indication method B, that is, in a case where a puncturing pattern is defined and an index corresponding to each puncturing patter is used, if a (local) BW indicated in PHY (e.g., in U-SIG) is up to 80 MHz and if two puncturing pattern are defined at 40 MHz and three puncturing patterns are defined at 80 MHz, since the total number of patterns is 5, a Max PI bit is 3 bit.

Figure 14:
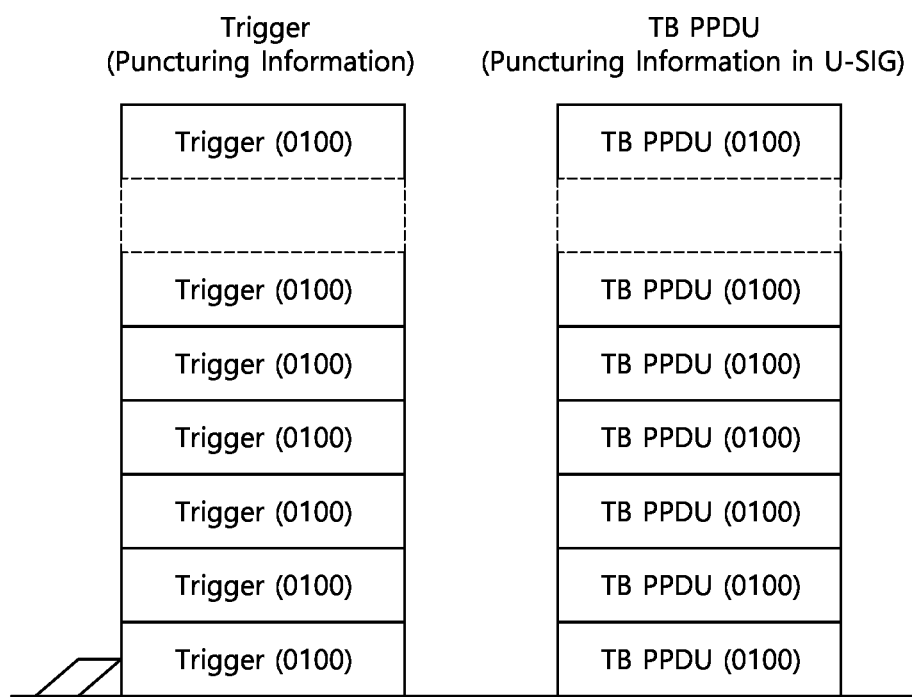
FIG. 14 illustrates an embodiment of the method 1-1B.

FIG. 14 illustrates an embodiment of the method 1-1B.

Referring to FIG. 14, a maximum (local) BW may be 160 MHz, and a UL BW may also be 160 MHz. For example, when the number of defined patterns is less than or equal to 16, the number of PI bits may be 4. When an index for a pattern in which a $2^{nd}$ 20 MHz segment is punctured is 0100, PI of a trigger frame may include a bitmap of 0100. A TB PPDU may include puncturing information in a U-SIG, and the puncturing information included in the U-SIG of the TB PPDU may also include the bitmap of 0100. The TB PPDU may also be transmitted through a channel in which a $2^{nd}$ 20 MHz segment is punctured.

Figure 15:
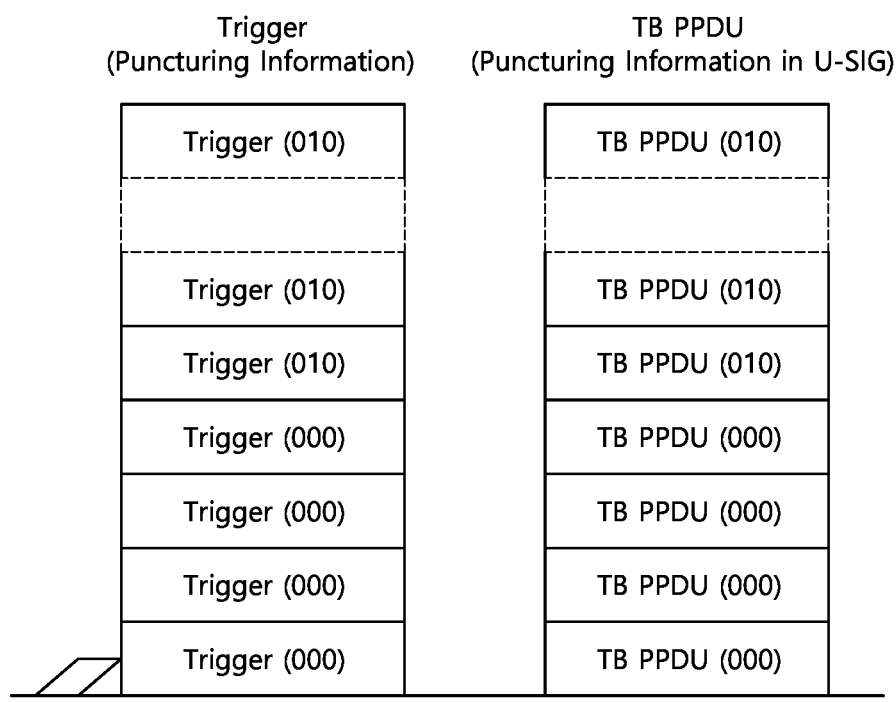
FIG. 15 illustrates an embodiment of the method 1-1B.

FIG. 15 illustrates an embodiment of the method 1-1B.

Referring to FIG. 15, a maximum (local) BW may be 80 MHz, and a UL BW may also be 80 MHz. For example, when the number of defined patterns is less than or equal to 8, the number of PI bits may be 3. When an index for a pattern in which a $2^{nd}$ 20 MHz segment is punctured is 010, PI of a trigger frame may include bitmaps of 010 and 000. That is, PI of a trigger frame transmitted at an 80 MHz band including a punctured region may include a bitmap of 010, and PI of a trigger frame transmitted at a non-punctured 80 MHz band may include a bitmap of 000. That is, if the PI of the trigger frame includes the bitmap of 010, it may mean that a $2^{nd}$ 2-MHz segment of 80 MHz is punctured, and if the PI of the trigger frame includes the bitmap of 000, it may mean that there is no part punctured in 80 MHz. A TB PPDU may include puncturing information in a U-SIG, and the puncturing information included in the U-SIG of the TB PPDU may also include the bitmaps of 010 and 000. The TB PPDU may also be transmitted through a channel in which a $2^{nd}$ 20 MHz segment is punctured.

1-2) Dynamic Method: It has a to-be-Determined (TBD) Bit According to a UL BW Value According to the present embodiment, the number of PI bits may vary depending on a UL BW value.

1-2A) In case of the indication method A, that is, in case of using a bitmap indicating independently whether each of 20 MHz segments is punctured, it is 8 bit if a UL BW is 160 MHz, and is 4 bit if the UL BW is 80 MHz.

1-2B) In case of the indication method B, that is, in a case where a puncturing pattern is defined and an index corresponding to each puncturing patter is used, if two puncturing pattern are defined at 40 MHz and three puncturing patterns are defined at 80 MHz, PI may be 1bit in case of 40 MHz, and may be 2 bit in case of 80 MHz.

The example 1-2) in which the UL BW is 160 MHz is the same as the example of FIG. 12 in which a maximum local BW is 160 MHz, except that the number of PI bits may change dynamically. For example, if a Max (local) BW is 160 MHz and a UL BW of a trigger frame is 80 MHz, the number of PI bits may be 4 bit, unlike in the example of the bitmap of FIG. 12.

2. Maintain Existing Trigger Frame, with at Least 160 MHz of Maximum UL BW

In order to indicate additional information while maintaining the existing trigger frame format, the existing bits shall be used while maintaining the total number of bits. In addition, in order to indicate a UL BW of at least 160 MHz, for example, a UL BW of 320 MHz, information of the 320 MHz BW may be additionally included in addition to a bit for the existing UL BW.

The present embodiment may additionally include a wider bandwidth indication (e.g., information indicating bandwidth extension, bandwidth extension information) in the method of the section 1. Hereinafter, only a wider bandwidth method is described, and a PI indication is the same as in the section 1.

1) Use of a Bit for a Wider Bandwidth

First, a wider bandwidth may be indicated by using an HE-SIG-A2 reserved field or reserved bit, and a method of indicating PI may use the method of the section 4.1. In particular, an indication method based on a puncturing pattern (the indication method B of the section 1) may be used to reduce an overhead.

Wider bandwidth indication: 1bit is used (for example, if 1, 320 MHz, if 0, reserved 240 MHz(if 240 MHz is defined))

PI Method: The Method of the Section 1 is Applied

Figure 16:
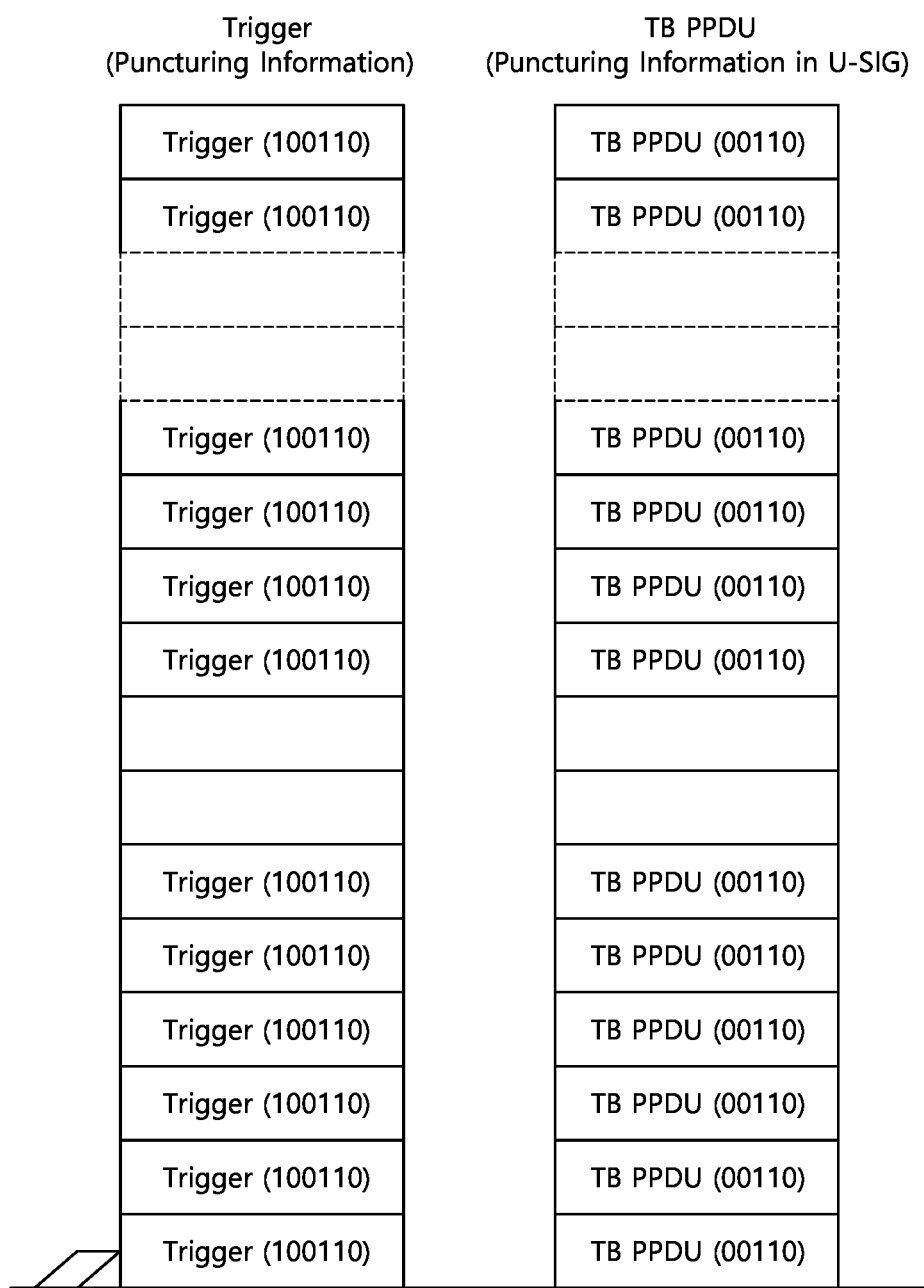
FIG. 16 illustrates an embodiment of a trigger frame/TB PPDU transmitted through a 320 MHz bandwidth by using the indication method B.

FIG. 16 illustrates an embodiment of a trigger frame/TB PPDU transmitted through a 320 MHz bandwidth by using the indication method B.

Referring to FIG. 16, a maximum (local) BW may be 320 MHz, and a UL BW may also be 320 MHz. For example, when the number of defined patterns is less than or equal to 32, the number of PI bits may be 5. PI of the trigger frame may include 1bit(1) related to the 320 MHz bandwidth. For example, the PI of the trigger frame may include a bitmap of 100110. If an index for a pattern in which 3rd and 4th 20 MHz segments of a primary 160 MHz are punctured and $1^{st}$ and $2^{nd}$ 20 MHz segments of a secondary 160 MHz are punctured is 00110, the PI of the trigger frame may include a bitmap of 00110. That is, if the PI of the trigger frame includes a bitmap of 100110, it may mean that 3rd, 4th, 9th, and 10th 20 MHz segments of 320 MHz are punctured. That is, a first bit may be related to a 320 MHz bandwidth, and last 5 bits may be related to the puncturing pattern. A TB PPDU may include puncturing information in a U-SIG, and the puncturing information included in the U-SIG of the TB PPDU may also include the bitmap of 00110. The TB PPDU may also be transmitted through a channel in which $3^{rd}$, $4^{th}$, $9^{th}$, and $10^{th}$ segments are punctured.

2) Define a New Trigger Variant for a Wider Bandwidth

That is, an additional wider bandwidth and PI thereof are indicated by using a trigger dependent common field through this variant. Information on a primary 160 of 320 MHz may be indicated by using methods defined in the section 1. That is, PI for a wider bandwidth and a secondary 160 MHz uses a dependent field.

2-1) when a Wider Bandwidth is Present Only in 320 MHz

Wider bandwidth indication: 1bit is used (for example, 320 MHz if 1)

PI: The same method as in the definition (up to 160 MHz) in the section 1 may be used.

In particular, the indication method B may be interpreted differently depending on a method. This is described in the following example.

Figure 17:
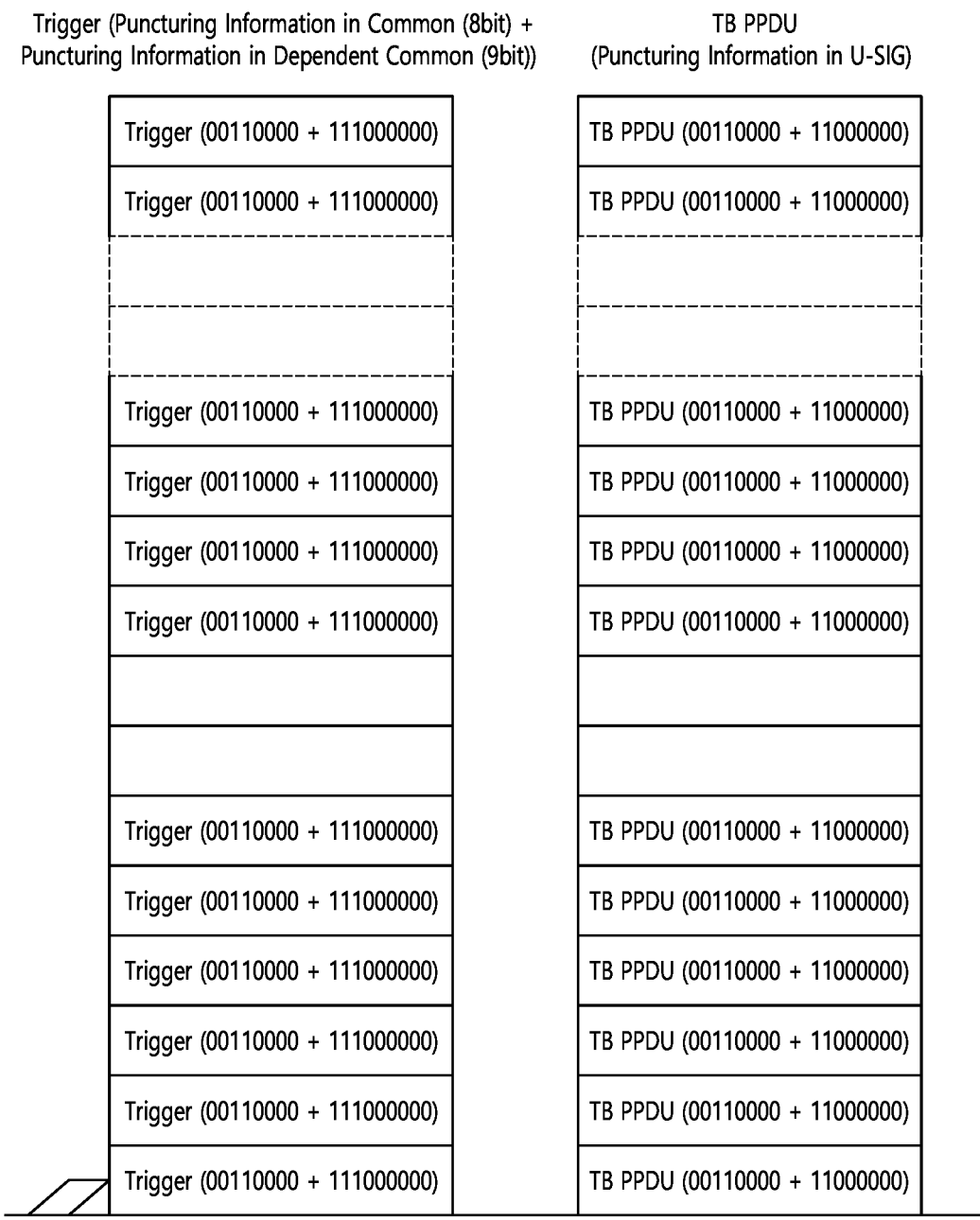
FIG. 17 illustrates an embodiment of a trigger frame/TB PPDU transmitted through a 320 MHz bandwidth by using the indication method A.

FIG. 17 illustrates an embodiment of a trigger frame/TB PPDU transmitted through a 320 MHz bandwidth by using the indication method A.

Referring to FIG. 17, a maximum (local) BW may be 320 MHz, and a UL BW may also be 320 MHz. Since the maximum UL BW is 320 MHz, the number of bits is 16. Herein, 1bit(1) related to the 320 MHz bandwidth may be additionally included. For example, PI of the trigger frame may include a bitmap of 00110000 111000000. A bitmap (i.e., 00110000) of 8 bit for primary 160 MHz may be included in a common field, and a bitmap (i.e., 111000000) for 1bit related to the 320 MHz bandwidth and 8 bit for secondary 160 MH may be included in a dependent common field. Since 3rd and 4th 20 MHz segments of the primary 160 MHz are punctured and $1^{st}$ and $2^{nd}$ 20 MHz segments of the secondary 160 MHz are punctured, the PI of the trigger frame may include the bitmap of 00110000 11000000. 1bit related to the 320 MHz bandwidth may be included in a first part of a bitmap for the secondary 160 MHz. That is, if the PI of the trigger frame includes the bitmap of 00110000 111000000, it may mean that $3^{rd}$, $4^{th}$, $9^{th}$, and $10^{th}$ 20 MHz segments of 320 MHz are punctured. That is, the 9th bit may be related to the 320 MHz bandwidth, and the remaining bits may be related to positions of the punctured 20 MHz segments. A TB PPDU may include puncturing information in a U-SIG, and the puncturing information included in the U-SIG of the TB PPDU may also include the bitmap of 00110000 11000000. The TB PPDU may also be transmitted through a channel in which $3^{rd}$, $4^{th}$, $9^{th}$, and 10th segments are punctured.

Figure 18:
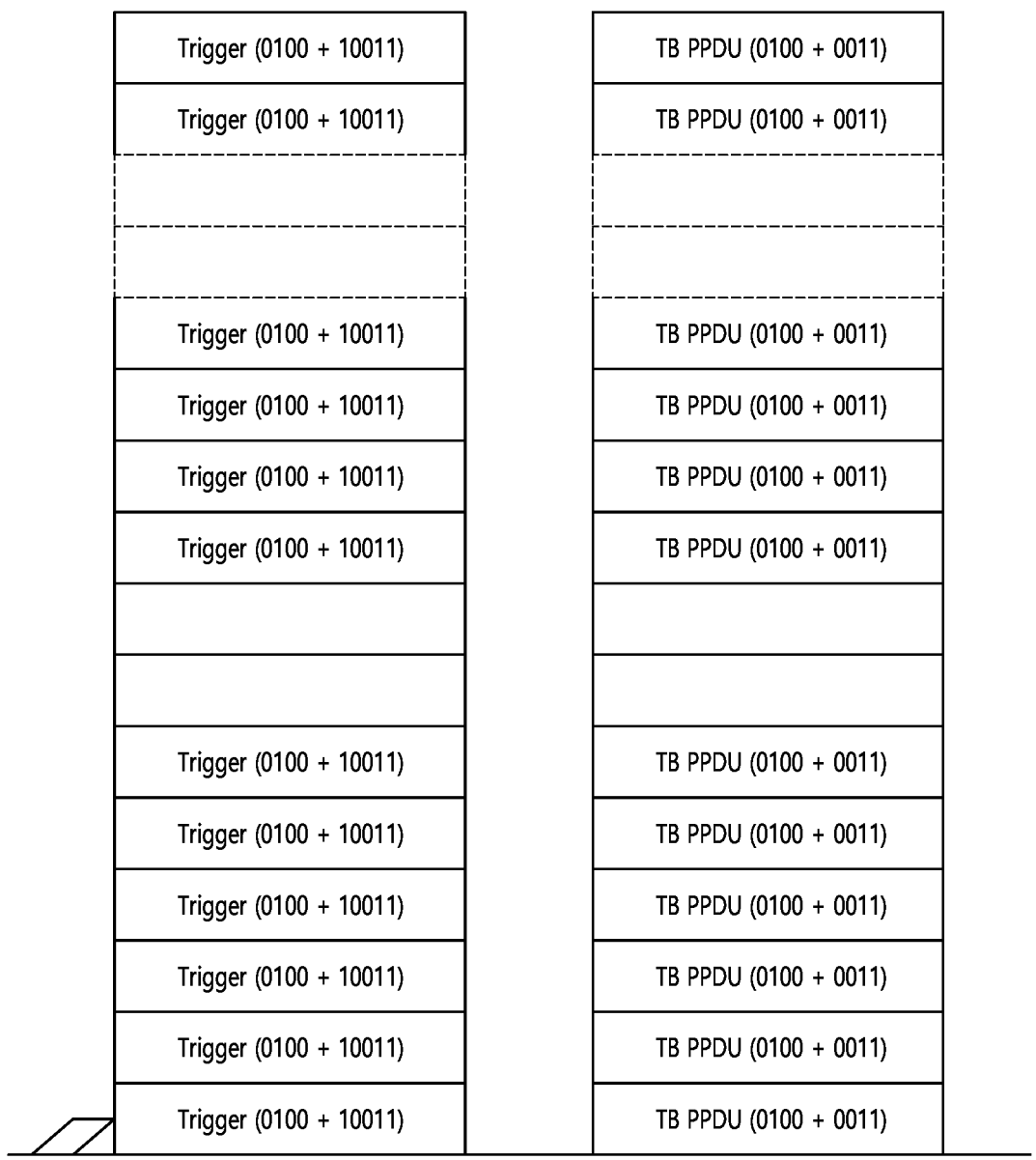
FIG. 18 illustrates an embodiment of a trigger frame/TB PPDU transmitted through a 320 MHz bandwidth by using the indication method B.

FIG. 18 illustrates an embodiment of a trigger frame/TB PPDU transmitted through a 320 MHz bandwidth by using the indication method B.

Referring to FIG. 18, a maximum (local) BW may be 320 MHz, and a UL BW may also be 320 MHz. $3^{rd}$ and $4^{th}$ 20 MHz segments of a primary 160 MHz may be punctured, and $1^{st}$ and $2^{nd}$ 20 MHz segments of a secondary 160 MHz may be punctured. For example, PI of the trigger frame may include a bitmap of 0100 10011. A bitmap (i.e., 0100) of 4 bit for primary 160 MHz may be included in a common field, and a bitmap (i.e., 10011) for 1bit related to the 320 MHz bandwidth and 4 bit for secondary 160 MH may be included in a dependent common field.

0100 and 0011 (except for 1bit indicating a wider bandwidth) may be interpreted differently according to a method.

(1) When the Total Bits Resulting from Combination of Indications at the Primary 160 and the Secondary 160 Indicate a Puncturing Pattern That is, it may mean that the total 8 bits of 01000011 indicate a pattern in which $3^{rd}$, $4^{th}$, $9^{th}$, and $10^{th}$ 20 MHz segments are punctured among 320 MHz puncturing patterns.

(2) When Respective Patterns at the Primary 160 and the Secondary 160 are Indicated That is, 0100 may mean a pattern in which $3^{rd}$ and $4^{th}$ 20 MHz segments patterns of the primary 160 are punctured, and 0011 may mean a pattern in which Pt and $2^{nd}$ 20 MHz segments of the secondary 160 are punctured.

The method (1) above may decrease the number of bits on average compared to the method (2), but it is not possible to know the entire puncturing pattern information until a STA reads a secondary 160 part.

2-2) when a Wider Bandwidth is Present in 240/320 MHz

Wider bandwidth indication: 1bit is used (for example, 320 MHz if 1, and 240 MHz if 0)

=> Since the wider bandwidth field has already been generated through the variant, both values 0/1 can be used.

PI: The same method as in the definition (up to 160 MHz) in the section 1 may be used.

=> This method is the same as in the method 2-1) except that 240 is indicated.

3. Maintain Existing Trigger Frame+Utilize User Info Field

In order to indicate additional information while maintaining the existing trigger frame format, the existing bits shall be used. In addition, in order to indicate at least 160 MHz, for example, a UL BW of 320 MHz, additional information may be necessarily included in addition to a bit for the existing UL BW.

In the sections 1 and 2, the common field is mainly used. If information different from 11ax is inserted in a reserved bit which is present in the common field, a malfunction may occur when this trigger frame is transmitted to a STA supporting flax. To prevent this, a specific user info field which does not read the STA supporting flax and reads only 11be STAs may be defined, and the 11be STAs may obtain specific information through these fields.

This method may set one specific AID. For example, 2047, 2048(or 2007), or the like which is reserved at present may be utilized. That is, upon recognizing this AID value, the 11be STA may decode fields belonging to User Info related to a corresponding AID.

Fields of User Info for the specific AID may be maintained without alternation from the existing case, or may be modified since the fields are for only the 11be STA.

The User Info for the specific AID may include puncturing information (PI). A method in which the PI is included may use a puncturing bitmap (the indication method A) and/or a puncturing pattern (the indication method B) as mentioned in the section 1/2, and both static/dynamic methods may be applied.

In particular, a UL BW of up to 160 MHz may be indicated in the common field as in the conventional case, and 240 or 320 MHz may be indicated in the User Info field (e.g., 1bit if only 320 MHz is present, 1 or 2 bit or the like if both 240/320 MHz are present). That is, information (e.g., wider bandwidth or bandwidth extension information) related to the 320 MHz bandwidth may be included in a user info field related to a specific AID.

In order to reduce a STA behavior and a decoding overhead, a field (i.e., a present field) in which a specific AID is present may be included in the common field of the trigger frame. For the present field, a reserved bit of the common field may be used.

That is, the STA may know whether special information based on a specific AID is included in the user info field, based on the present field of the common field. If the special information based on the specific AID is included based on the present field, the STA may perform an operation of finding the specific AID, and if the special information based on the specific AID is not included based on the present field, the STA may perform only a behavior of finding only an AID thereof without having to perform the behavior of finding the specific AID.

Figure 19:
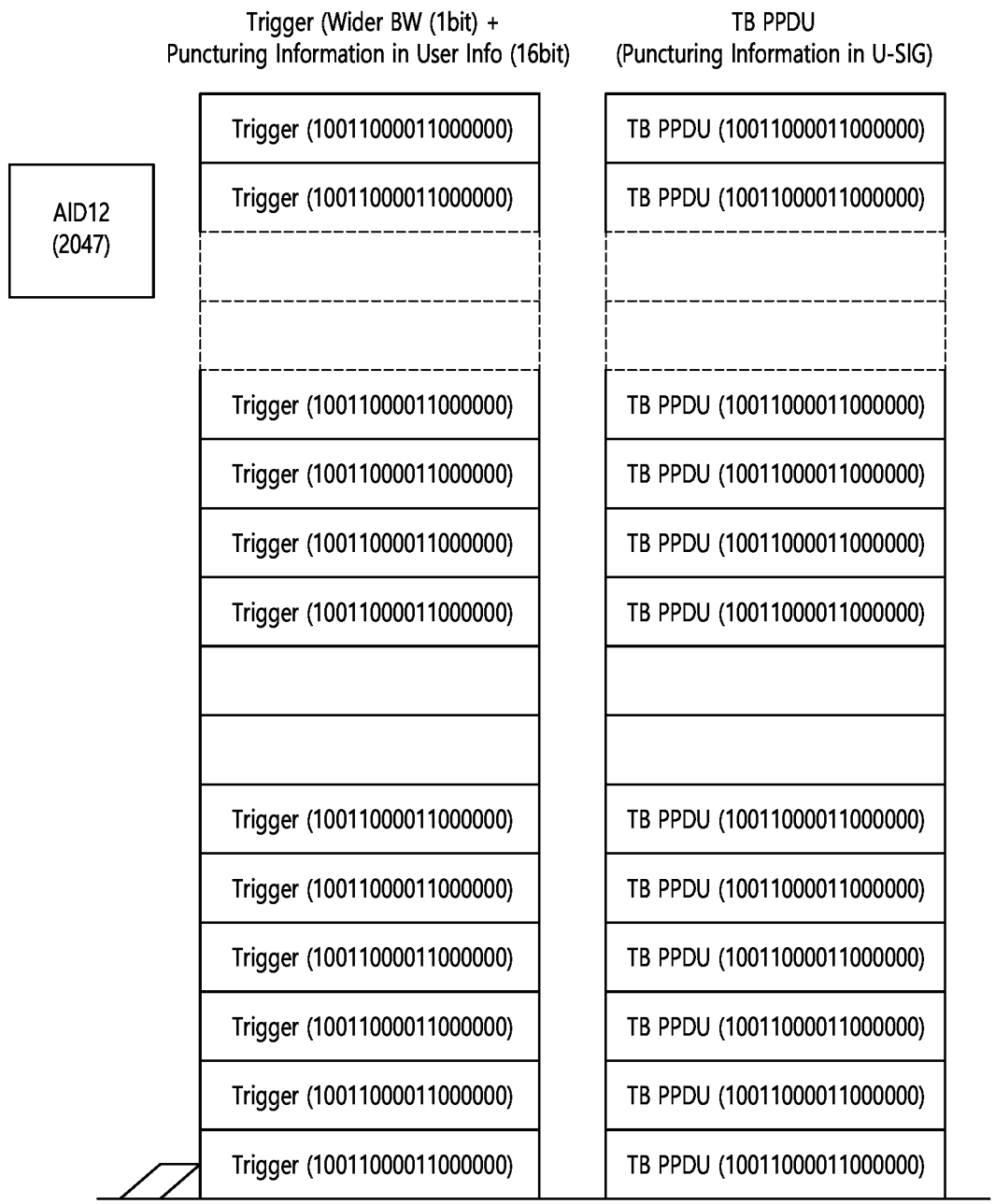
FIG. 19 illustrates an embodiment of a method in which special information is included in a user info field related to a specific AID.

FIG. 19 illustrates an embodiment of a method in which special information is included in a user info field related to a specific AID.

Referring to FIG. 19, a user info field in which a value of an AID12 field is set to 2047 may include additional information for an 11be STA. That is, a specific AID12 value (e.g., 2047, 2007, etc.) is a value which allows the STA to be able to recognize different additional information (e.g., PI, information related to 320 MHz bandwidth, etc.) for a trigger. That is, a bitmap "1001100011000000" may be included in the user info field related to the value of the specific AID12 field, and '1' in the first part of the bitmap may be related to the 320 MHz bandwidth, and "0011000011000000" in the last part may mean a 16-bit PI bitmap in units of 20 MHz. Herein, if a UL BW of a common field is indicated as 160 MHz, the 11be STA may first recognize this, and then may recognize whether a bandwidth is 320 MHz through the user info field related to the specific AID (2047) of User Info.

Figure 20:
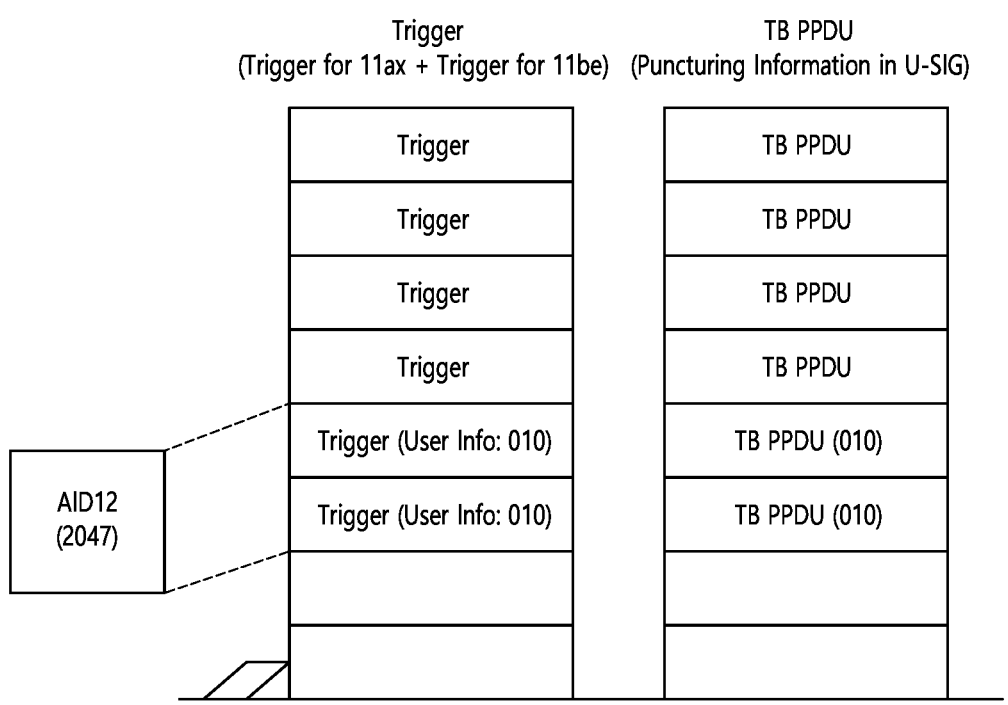
FIG. 20 illustrates an embodiment of a method in which special information is included in a user info field related to a specific AID.

FIG. 20 illustrates an embodiment of a method in which special information is included in a user info field related to a specific AID.

Referring to FIG. 20, some parts of a trigger frame may be transmitted for an 11ax STA, and some parts thereof may be transmitted for an 11be STA. For example, the trigger frame may be transmitted with UL BW 160 MHz to the STAs of 11ax (above 80 MHz) and 11be (below 80 MHz). It may be transmitted separately for each 80 MHz UL BW. In the present embodiment, common information is the same in a full 160 MHz band, and special information (e.g., PI) may be transferred to the 11be STA through a specific AID12 (2047) additionally in the user info field. For example, a puncturing pattern in which 7th and 8th 20 MHz segments are punctured may be indicated by 010.

Figure 21:
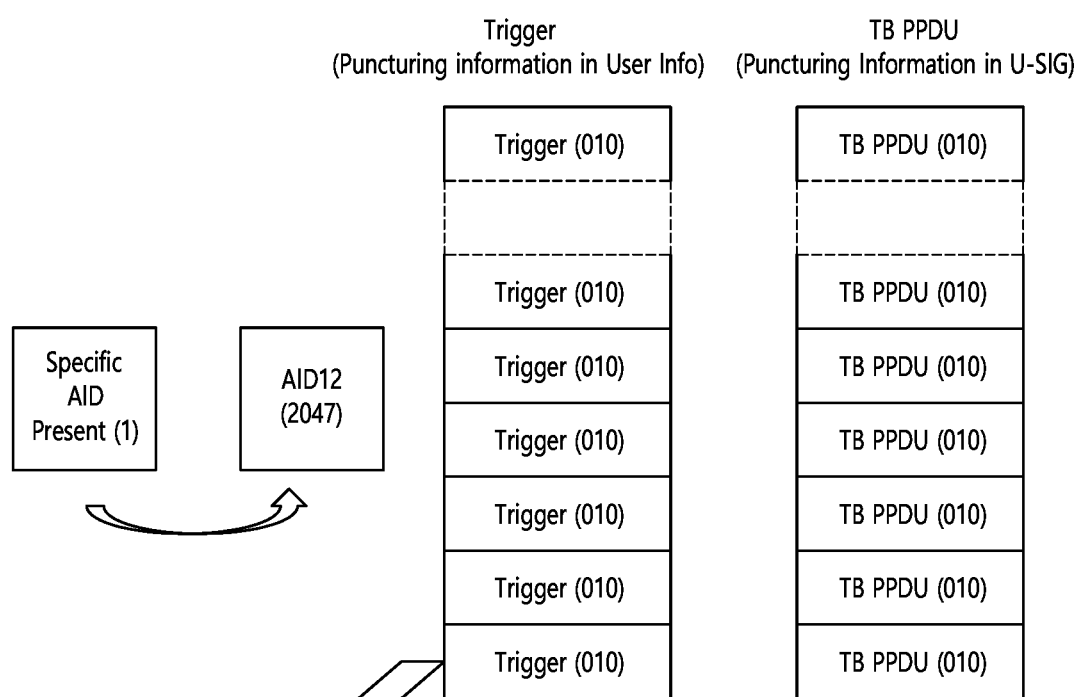
FIG. 21 illustrates an embodiment of a method in which special information is included in a user info field related to a specific AID.

FIG. 21 illustrates an embodiment of a method in which special information is included in a user info field related to a specific AID.

Referring to FIG. 21, a puncturing pattern in which a second 20 MHz segment is punctured may be indicated by 010. A trigger frame may include a common info field and a user info field. The common info field may include a present field (e.g., a specific AID present field) related to whether the user info field includes the special information. That is, the common info field may have the present field indicating a presence of a specific AID12 (e.g., 2407) of the user info field. When the present field includes information indicating that the specific AID12 is present in the user info field, the user info field may include the AID12 (e.g., 2047) for the special information. For example, the special information may include puncturing information (PI) and/or information related to a 320 MHz bandwidth. For example, the special information may include information for a STA supporting a standard of 11be or post 11be. A value of the AID12 related to the special information is not limited to an embodiment, and may have a value (e.g., 2007, etc.) other than 2047.

Figure 22:
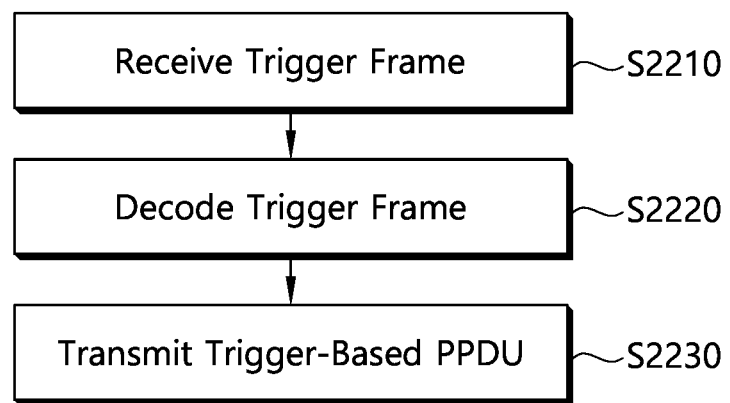
FIG. 22 illustrates an embodiment of a method of operating a STA.

FIG. 22 illustrates an embodiment of a method of operating a STA.

Referring to FIG. 22, the operation of the STA may be based on technical features described with reference to at least one of FIG. 1 to FIG. 21.

The STA may receive a trigger frame (S2210). For example, the STA may receive the trigger frame from an access point (AP). For example, the trigger frame may include a common information field and a user information field. For example, the user information field may include a first field related to an association identifier (AID) and a second field including information for a STA related to the AID. For example, the second field may include special information for all STAs which receive the trigger frame, based on that the first field has a specific value. For example, the common information field may include a present field related to whether the user information field having the specific value is present in the first field of the user information field.

For example, the first field may be an AID12 field. For example, the second field may be subfields of a user info field related to AID12.

For example, the common information field may include uplink transmission bandwidth information.

For example, the special information may include information related to a 320 MHz uplink transmission bandwidth.

For example, the special information may include puncturing information. The trigger frame may be transmitted through a channel subjected to puncturing based on the puncturing information.

For example, the puncturing information may include information related to whether puncturing is performed for each 20 MHz unit band.

For example, the puncturing information may include information related to an index corresponding to a pre-set puncturing pattern.

The STA may decode the trigger frame (S2220).

The STA may transmit a trigger-based PPDU (S2230). For example, the STA may transmit the trigger-based PPDU to the AP, and the trigger-based PPDU may be transmitted with a band based on the puncturing information.

Figure 23:
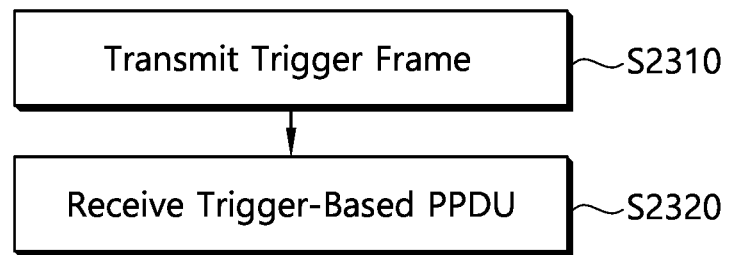
FIG. 23 illustrates an embodiment of a method of operating an AP.

FIG. 23 illustrates an embodiment of a method of operating an AP.

Referring to FIG. 23, the operation of the AP may be based on technical features described with reference to at least one of FIG. 1 to FIG. 21.

The AP may transmit a trigger frame (S2310). For example, the AP may transmit the trigger frame to a station (STA).

For example, the trigger frame may include a common information field and a user information field. For example, the user information field may include a first field related to an association identifier (AID) and a second field including information for a STA related to the AID. For example, the second field may include special information for all STAs which receive the trigger frame, based on that the first field has a specific value. For example, the common information field may include a present field related to whether the user information field having the specific value is present in the first field of the user information field.

For example, the first field may be an AID12 field. For example, the second field may be subfields of a user info field related to the AID12.

For example, the common information field may include uplink transmission bandwidth information.

For example, the special information may include information related to a 320 MHz uplink transmission bandwidth.

For example, the special information may include puncturing information. The trigger frame may be transmitted through a channel subjected to puncturing based on the puncturing information.

For example, the puncturing information may include information related to whether puncturing is performed for each 20 MHz unit band.

For example, the puncturing information may include information related to an index corresponding to a pre-set puncturing pattern.

The AP may receive a trigger-based PPDU (S2320). For example, the AP may receive, from the STA, a trigger-based physical protocol data unit (PPDU) in response to the trigger frame.

Some of detailed steps shown in the example of FIG. 22 and FIG. 23 may not be essential steps and may be omitted. Other steps may be added in addition to the steps shown in FIG. 22 and FIG. 23, and orders of the steps may vary. Some steps the above steps may have independent technical meaning.

The aforementioned technical feature of the present specification may be applied to various devices and methods. For example, the aforementioned technical feature of the present specification may be performed/supported through the device of FIG. 1 and/or FIG. 10. For example, the aforementioned technical feature of the present specification may be applied only to part of FIG. 1 and/or FIG. 10. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 10. For example, the device of the present specification includes: a memory; and a processor operatively connected to the memory. The processor may be adapted to: receive a trigger frame from an access point (AP), wherein the trigger frame includes a common information field and a user information field, the user information field includes a first field related to an association identifier (AID) and a second field including information for a STA related to the AID, the second field includes special information for all STAs which receive the trigger frame, based on that the first field has a specific value, and the common information field includes a present field related to whether the user information field having the specific value is present in the first field of the user information field; and decode the trigger frame.

The technical feature of the present specification may be implemented based on a computer readable medium (CRM). For example, the CRM proposed by the present specification is at least one computer readable medium having an instruction executed by at least one processor of a transmitting station (STA) MLD of a WLAN system to perform an operation including: receiving a trigger frame from an access point (AP), wherein the trigger frame includes a common information field and a user information field, the user information field includes a first field related to an association identifier (AID) and a second field including information for a STA related to the AID, the second field includes special information for all STAs which receive the trigger frame, based on that the first field has a specific value, and the common information field includes a present field related to whether the user information field having the specific value is present in the first field of the user information field; and decoding the trigger frame.

Instructions stored in a CRM of the present specification may be executed by at least one processor. The at least one processor related to the CRM of the present specification may be the processors 111 and 121 or processing chips 114 and 124 of FIG. 1 or the processor 610 of FIG. 10. Meanwhile, the CRM of the present specification may be the memories 112 and 122 of FIG. 1 or the memory 620 of FIG. 10 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a station (STA) of a wireless local area network (WLAN) system, the method comprising:
receiving a trigger frame from an access point (AP),
wherein the trigger frame includes a common information field and a user information field,
wherein the common information field has a value that identifies uplink bandwidth for all STAs associated with the AP, including the STA,
wherein the user information field includes an association identifier (AID) subfield,
wherein based on the AID subfield having a value recognizable by all the STAs associated with the AP, the user information field further includes an uplink bandwidth extension subfield having a value that identifies an extension of the uplink bandwidth identified by the value in the common information field,
wherein the user information field is contiguous to the common information field; and
transmitting a trigger based physical protocol data unit (TB PPDU) in response to the trigger frame.

2. The method of claim 1, wherein the user information field is a special user information field including information that is not provided by the common information field, but is common to all of the STAs.

3. The method of claim 1, wherein the AID subfield has a length of 12 bits, and the pre-defined value is 2007.

4. The method of claim 1, wherein uplink bandwidth extension subfield has a length of 2 bits.

5. The method of claim 1, wherein based on the AID subfield having the value recognizable by all the STAs, the trigger frame further includes an additional user information field including user specific information related to only one of all the STAs.

6. The method of claim 1, wherein the AP is an extremely high throughput (EHT) AP and the STA is an EHT non-AP STA.

7. The method of claim 1, wherein the uplink bandwidth extension subfield value extends the uplink bandwidth identified by the value in the common information field from 160 MHz to 320 MHz.

8. A station (STA) of a wireless local area network (WLAN) system, comprising:
a transceiver transmitting and receiving a radio signal; and
a processor connected to the transceiver, wherein the processor is adapted to: receive a trigger frame from an access point (AP),
wherein the trigger frame includes a common information field and a user information field,
wherein the common information field has a value that identifies uplink bandwidth for all STAs associated with the AP, including the STA,
wherein the user information field includes an association identifier (AID) subfield,
wherein based on the AID subfield having a value recognizable by all the STAs associated with the AP, the user information field further includes an uplink bandwidth extension subfield having a value that identifies an extension of the uplink bandwidth identified by the value in the common information field,
wherein the user information field is contiguous to the common information field; and
transmit a trigger based physical protocol data unit (TB PPDU) in response to the trigger frame.

9. The STA of claim 8, wherein the user information field is a special user information field including information that is not provided by the common information field, but is common to all of the STAs.

10. The STA of claim 8, wherein the AID subfield has a length of 12 bits, and the pre-defined value is 2007.

11. The STA of claim 8, wherein uplink bandwidth extension subfield has a length of 2 bits.

12. The STA of claim 8, wherein based on the AID subfield having the value recognizable by all the STAs, the trigger frame further includes an additional user information field including user specific information related to only one of all the STAs.

13. The STA of claim 8, wherein the AP is an extremely high throughput (EHT) AP and the STA is an EHT non-AP STA.

14. The STA of claim 8, wherein the uplink bandwidth extension subfield value extends the uplink bandwidth identified by the value in the common information field from 160 MHz to 320 MHz.

15. An access point (AP) of a wireless local area network (WLAN) system, comprising:
a transceiver transmitting and receiving a radio signal; and
a processor connected to the transceiver, wherein the processor is adapted to:
transmit a trigger frame to a station (STA),
wherein the trigger frame includes a common information field and a user information field,
wherein the common information field has a value that identifies uplink bandwidth for all STAs associated with the AP, including the STA, wherein the user information field includes an association identifier (AID) subfield, wherein based on the AID subfield having a value recognizable by all the STAs associated with the AP, the user information field further includes an uplink bandwidth extension subfield having a value that identifies an extension of the uplink bandwidth identified by the value in the common information field, wherein the user information field is contiguous to the common information field; and receive a trigger based physical protocol data unit (TB PPDU) in response to the trigger frame.

16. The AP of claim 15, wherein the user information field is a special user information field including information that is not provided by the common information field, but is common to all of the STAs.

17. The AP of claim 15, wherein the AID subfield has a length of 12 bits, and the pre-defined value is 2007.

18. The AP of claim 15, wherein uplink bandwidth extension subfield has a length of 2 bits.

19. The AP of claim 15, wherein based on the AID subfield having the value recognizable by all the STAs, the trigger frame further includes an additional user information field including user specific information related to only one of all the STAs.

20. The AP of claim 15, wherein the AP is an extremely high throughput (EHT) AP and the STA is an EHT non-AP STA.

21. The AP of claim 15, wherein the uplink bandwidth extension subfield value extends the uplink bandwidth identified by the value in the common information field from 160 MHz to 320 MHz.

* * * * *